Patented Nov. 24, 1936

2,061,946

UNITED STATES PATENT OFFICE 2,061,946

ARTIFICIAL MASSES

Erich Kuehn, Mannheim, and Heinrich Hopff, Ludwigshafen-on-the-Rhine, Germany, assignors to I. G. Farbenindustrie Aktiengesellschaft, Frankfort-on-the-Main, Germany No Drawing. Application December 16, 1933, Serial No. 702,790. In Germany December 23, 1932

15 Claims. (Cl. 260—2)

The present invention relates to artificial masses and a process of producing same.

It has already been proposed to prepare compounds similar to acetals from polymerized organic compounds containing hydroxyl groups and aldehydes. Thus for example polymerized vinyl alcohol may be caused to react with aldehydes with the formation of compounds similar to acetals. Under mild conditions, acetals which are smoothly soluble in organic solvents are obtained; under energetic conditions, products similar to acetals are certainly obtained but they are no longer soluble in organic solvents.

We have now found that readily soluble and very valuable artificial compositions are obtainable by causing polymerized organic compounds containing hydroxyl groups, as for example polymerized vinyl alcohols or polymerized hydroxystyrenes, to react with alpha-halogenalkyl ethers, i. e. with alpha-halogenalkyl ethers added to the reaction mixture as such or with alpha-halogenalkyl ethers produced in situ by reacting vinyl ethers with hydrogen halides. By "alpha-halogenalkyl ethers" are meant compounds containing at least two hydrocarbon radicals which are joined together by means of an oxygen atom, one of said hydrocarbon radicals being a halogenalkyl group in which a halogen atom is attached to the same carbon atom (alpha carbon atom) to which the oxygen atom is joined. Suitable compounds of the said kind are for example monochlordimethyl ether (obtainable from paraformaldehyde, methanol and gaseous hydrochloric acid), monochlormethylbutyl ether (obtainable from paraformaldehyde, butanol and gaseous hydrochloric acid), alpha-chlorethylbutyl ether (obtainable from acetaldehyde, butanol and gaseous hydrochloric acid), alpha-chlordibutyl ether (obtainable from butyraldehyde, butanol and gaseous hydrochloric acid), alpha-chlorethylphenyl ether (obtainable from vinylphenyl ether and gaseous hydrochloric acid) ethyl-alpha-chlorbenzyl ether (obtainable from benzal chloride and alcoholic ammonia), alpha-beta-beta-beta-tetrachlordiethyl ether (obtainable from chloral alcoholate and phosphorus pentachloride) and chlorethyl ethyl ether (obtainable from vinyl-ethyl ether and hydrogen chloride).

The reaction may be effected while using vinyl ethers in the presence of halogen hydrides, namely hydrogen chloride, bromide or iodide; in this manner of working alpha-halogenalkyl ethers are formed within the reaction mixture itself, as for example according to the British Specification No. 352,070 by the action of halogen hydrides on vinyl ethers, the alpha-halogenalkyl ethers being allowed to act on the compound containing hydroxyl groups without previous isolation. Suitable vinyl ethers are for example vinylmethyl ether, vinylethyl ether, vinylbutyl ether, vinyldodecyl ether, vinyl octodecyl ether or divinyl ether. The halogen hydrides may be used in small amounts thus producing small amounts of the said halogen ethers from which halogen hydride is again split off and acts on further amounts of vinyl ether until all the vinyl ether has reacted. The hydrogen halides may be used in dissolved or gaseous form. The reaction may be carried out in the presence of catalysts, diluents or solvents. Suitable diluents are for example water, alcohols, ketones such as acetone, chloroform, carbon tetrachloride, methylene chloride, benzene and toluene. If non-dissolving diluents are employed, it is preferable to finely disperse the materials under treatment. The treatment may be effected at ordinary or slightly elevated temperature. Temperatures above the boiling temperatures of the solvents mentioned above are not employed. It is possible to work under elevated pressure but this usually has no advantage. Suitable catalysts are those favoring the splitting off of halogen hydrides, such as zinc chloride, ferric chloride and aluminium chloride.

By varying the reaction conditions as regards the ether and the polymerized organic compound containing hydroxyl groups employed, the properties of the resulting artificial compositions, such as strength, elasticity, thermal stability, thermal plasticity, surface hardness and viscosity, may be influenced to a very great extent. The compositions are solid, practically colorless compounds capable of forming highly viscous solutions in water or organic solvents. The properties of the products may also be influenced by the proportions of the components employed; thus only a part of the hydroxyl groups in the polymerized organic compounds may be brought into reaction. In many cases it is advantageous to employ 1 molecular proportion of ether or such amounts of polymerized vinyl alcohol as are formed by the polymerization of 1 molecular proportion of monomeric vinyl alcohol. The free hydroxyl groups may then be esterified or etherified according to known methods.

The reaction may be carried out by gradually introducing the compounds capable of reacting as alpha-halogenalkyl ethers into the polymerized organic compound containing hydroxyl groups suspended or dissolved in an inert solvent, care being taken if desired for the removal of the acid formed. The reaction may also be carried out with the metal compounds of the polymerized organic compounds containing hydroxyl groups (as for example with the alkali metal or alkaline earth metal alcoholates) or in the presence of tertiary bases as diluents; in this manner any hydrolytic degradation of the polymerized organic compounds containing hydroxyl groups during the reaction is prevented. Which of the said methods is preferable depends on the speed of reaction and the nature of the components. Finally, the reaction may also be carried out for example on cotton fabrics and the like for the production of special fabric effects.

Suitable catalysts are for example compounds favoring the splitting off of halogen hydrides, such as zinc chloride and aluminium chloride.

The artificial compositions obtained are capable of employment for a great variety of purposes. They may be employed as pressing compositions, insulating materials, lacquer raw materials, adhesives and protective colloids, and are eminently suitable for the preparation of films and artificial threads. They may be employed with advantage as thickening agents in dyestuff preparations or pastes. They may also be worked together with other known organic materials, such as cellulose esters or ethers, rubber or drying oils.

The following examples will further illustrate the nature of this invention but the invention is not restricted to these examples. The parts are by weight.

Example 1

44 parts of polymerized vinyl alcohol are suspended in 500 parts of boiling chloroform. 80 parts of monochlordimethyl ether (obtainable from paraformaldehyde, methanol and hydrogen chloride gas) are allowed to drop gradually into the said suspension while stirring vigorously. Evolution of hydrogen chloride immediately takes place. The reaction mixture gradually acquires a jelly-like consistency. After about 4 hours a completely clear highly viscous solution is obtained which is washed with water until neutral, the solvent then being removed by leading through steam. The resulting reaction product is a white solid mass which dissolves in chlorinated hydrocarbons, such as methylene chloride, ethylene chloride and chloroform, and also in dioxane.

Example 2

122 parts of chlormethyl-normal-butyl ether (obtainable from paraformaldehyde, normal butanol and hydrogen chloride gas) are allowed to drop slowly into a suspension of 44 parts of polymerized vinyl alcohol in 500 parts of boiling chloroform while stirring vigorously. The reaction proceeds similarly to that in Example 1 with a vigorous evolution of hydrogen chloride. The reaction product is a white solid mass which dissolves in chlorinated hydrocarbons and dioxane yielding very viscous solutions.

Example 3

44 parts of polymerized vinyl alcohol are suspended in 500 parts of chloroform and condensed in the presence of 0.5 part of pyridine with 108 parts of alpha-chlordiethyl ether in the manner described in Example 1.

Instead of alpha-chlordiethyl ether equimolecular amounts of other compounds may be used, for example of alpha-chlormethyl-hexyl ether, alpha-chlorethylbutyl ether, alpha-chlorethyl hexyl ether, alpha-chlorethyl-octodecyl ether and alpha-chlorbutylethyl ether.

The products are solid practically colorless masses. The higher the molecular weight of the chlorethers used the lower is the softening point of the products. They are soluble in methylene chloride, ethylene chloride, chloroform and dioxane.

Example 4

44 parts of polymerized vinyl alcohol are suspended in 500 parts of chloroform. After adding 2 parts of hydrochloric acid (d=1.2), 80 parts of vinyl ethyl ether are allowed to drop in while stirring vigorously and cooling with ice-cold water. As soon as a clear viscous solution is obtained, the reaction is completed. After expelling the solvent, a white solid mass is obtained which dissolves in chlorinated hydrocarbons and alcohol.

What we claim is:—

1. The process of producing artificial compositions which comprises causing a ploymerized vinyl alcohol to react with an alpha-halogenalkyl ether said ether containing at least 2 hydrocarbon radicals which are joined together by means of an oxygen atom.

2. The process of producing artificial compositions which comprises causing a polymerized vinyl alcohol to react with an alpha-halogenalkyl ether said ether containing at least 2 hydrocarbon radicals which are joined together by means of an oxygen atom in a diluent.

3. The process of producing artificial compositions which comprises causing a polymerized vinyl alcohol to react with an alpha-halogenalkyl ether said ether containing at least 2 hydrocarbon radicals which are joined together by means of an oxygen atom in a diluent in the presence of a catalyst favoring the splitting off of halogen hydrides.

4. The process of producing artificial compositions which comprises causing a polymerized vinyl alcohol to react with a vinyl ether in the presence of a halogen hydride.

5. Artificial compositions obtainable by condensing a polymerized vinyl alcohol with an alpha-halogenalkyl ether said ether containing at least 2 hydrocarbon radicals which are joined together by means of an oxygen atom.

6. Artificial compositions comprising solid, practically colorless masses capable of yielding highly viscous solutions in water and organic solvents, the said compositions being obtainable by condensing a polymerized vinyl alcohol with an alpha-halogenalkyl ether said ether containing at least 2 hydrocarbon radicals which are joined together by means of an oxygen atom.

7. Artificial compositions being condensation products of a polymerized vinyl alcohol with an alpha-halogenalkyl ether said ether containing at least 2 hydrocarbon radicals which are joined together by means of an oxygen atom.

8. Artificial compositions obtainable by condensation of a polymerized vinyl alcohol with a vinyl ether in the presence of a halogen hydride.

9. Artificial compositions obtainable by condensation of a polymerized vinyl alcohol with methyl vinyl ether in the presence of a halogen hydride.

10. Artificial compositions obtainable by condensation of a polymerized vinyl alcohol with ethyl vinyl ether in the presence of a halogen hydride.

11. The process of producing artificial compositions which comprises causing a polymerized vinyl alcohol to react with a vinyl ether in the presence of hydrogen chloride.

12. Artificial compositions obtainable by condensation of a polymerized vinyl alcohol with a vinyl ether in the presence of hydrogen chloride.

13. Artificial compositions obtainable by condensation of a polymerized vinyl alcohol with methyl vinyl ether in the presence of hydrogen chloride.

14. Artificial compositions obtainable by condensation of a polymerized vinyl alcohol with ethyl vinyl ether in the presence of hydrogen chloride.

15. Artificial compositions obtainable by condensation of a polymerized vinyl alcohol with chlormethyl-n-butylether.

ERICH KUEHN.
HEINRICH HOPFF.